United States Patent [15] 3,638,398
Domine et al. [45] Feb. 1, 1972

[54] METHOD OF SEPARATION BY SUBSTANTIALLY ISOTHERMAL SELECTIVE ADSORPTION OF A GASEOUS MIXTURE

[72] Inventors: Daniel Domine, Meudon; Leon Jay, Paris, both of France

[73] Assignee: L'Air Liquide, Societe Anonyme pour l'Etude et l'Exploitation des procedes Georges Claude

[22] Filed: Aug. 1, 1969

[21] Appl. No.: 846,668

[30] Foreign Application Priority Data

Aug. 8, 1968 France....................................162344

[52] U.S. Cl.......................................................55/25, 55/58
[51] Int. Cl...........................................................B01d 3/04
[58] Field of Search........................55/25, 33, 58, 62, 75, 74

[56] References Cited

UNITED STATES PATENTS

| | | | |
|---|---|---|---|
| 3,085,379 | 4/1963 | Kiyonaga et al. | 55/62 |
| 3,338,030 | 8/1967 | Feldbauer, Jr. | 55/62 |
| 3,430,418 | 3/1969 | Wagner | 55/25 |

*Primary Examiner*—Charles N. Hart
*Attorney*—Young & Thompson

[57] ABSTRACT

A method of separation by substantially isothermal adsorption of a gaseous mixture in the presence of an impurity, with desorption by the sole action of a vacuum, in which there is admitted through a first zone of a chamber, a gaseous mixture to be separated, a gaseous fraction enriched in the less adsorbable main constituent being extracted through a second zone of the chamber by expansion, a gaseous fraction enriched in the more adsorbable main constituent and in impurity is extracted through the first zone by the action of a vacuum, and the gaseous fraction enriched in the less adsorbable main constituent separated out during the previous cycle is admitted through the second zone.

1 Claims, 3 Drawing Figures

METHOD OF SEPARATION BY SUBSTANTIALLY ISOTHERMAL SELECTIVE ADSORPTION OF A GASEOUS MIXTURE

The present invention relates to a method of separation by substantially isothermal adsorption in a chamber containing an adsorbent mass, of a gaseous mixture comprising two main constituents which can be desorbed by the sole action of a vacuum.

Methods of this kind, which especially permit the separation of air into oxygen and nitrogen, or that of mixtures of nitrogen and hydrogen, have formed the particular object of French Pat. No. 1,223,261 of Nov. 21, 1957, by the present applicants. These methods can however only be applied to gaseous mixtures free from impurities and strongly adsorbable on the adsorbent mass, such as water vapor, carbon dioxide and ammonia, in the presence of zeolites or active carbons generally employed for separation operations of this kind.

In fact, the impurity is frequently adsorbed on the said adsorbent mass with sufficient strength to preclude its elimination in a satisfactory manner during the application of vacuum, unless a period of time is employed which is incompatible with the duration of the adsorption cycle. Under these conditions, the impurity accumulates in the adsorbent mass in which it becomes distributed, which considerably reduces the efficiency and the quality of the separation.

It is for this reason that, in the case where an impurity is present in the gaseous mixture to be separated, it is eliminated by means of a previous purification.

This considerably complicates the method and necessitates much additional equipment, working under the maximum pressure of the gaseous mixture to be separated, the purification being effected either by a technique other than adsorption, or by adsorption with regeneration of the adsorbent by heating, followed by its cooling, which requires a suitable column working in a purification phase having a relatively long duration (several hours) followed by a regeneration phase having an equally long duration.

The method of the invention has the purpose of overcoming the above-mentioned drawbacks and of ensuring the separation of such gaseous mixtures in the presence of one or more impurities strongly retained by the adsorbent employed, obtaining a gas enriched in the least adsorbable constituent and substantially free from the said impurities, without proceeding to any preliminary purification.

The method according to the invention consists, in a chamber previously put under vacuum and then filled with a fraction enriched in the less adsorbable main constituent, of admitting through a first zone of the chamber a given quantity of the gaseous mixture to be separated, so as to obtain in the chamber a pressure higher than atmospheric pressure, and is characterized in that there is drawn off through a second zone of the chamber, by expansion to an intermediate pressure, a gaseous fraction enriched in the less adsorbable main constituent, after which there is extracted through the first zone by the action of a vacuum, a gaseous fraction enriched in the most adsorbable main constituent and in impurity, and finally there is admitted through the second zone a part of the gaseous fraction enriched in the less adsorbable main constituent which has been separated out during the preceding cycle, in sufficient quantity to bring the gaseous pressure in contact with the adsorbent mass to a high value with respect to the residual partial pressure of the impurity.

The whole of these operations or phases can be repeated periodically by the introduction at each cycle of a fresh quantity of gaseous mixture into the chamber. Matters can be arranged so that the said phases take place successively, the end of each of them coinciding with the beginning of that next following.

The separation of the gases and the elimination of the impurity become better as the contact time is longer between the mixture and the adsorbent mass. Thus, in accordance with a form of embodiment of the invention, the first and second zones are chosen in such manner that the travel of the gas through the adsorbent mass is a maximum.

After the stage consisting of extracting the gaseous fraction enriched in the less adsorbable main constituent, the pressure in the chamber may be in the vicinity of atmospheric pressure, or possibly higher; in this latter case, before the extraction stage by the action of vacuum of the gaseous fraction enriched in the more adsorbable main constituent and in impurity, these gases are expanded at the level of the first zone in order to cause them to pass from the above-mentioned pressure to atmospheric pressure.

During the stage of admission to the second zone of part of the gaseous fraction enriched in the less adsorbable main constituent, which has been separated during the previous cycle, there is a displacement of the impurity towards the first zone by the carrying away action of the said gaseous fraction. It may be particularly advantageous to effect an additional evacuation of the impurity which has accumulated in the first zone.

To this end, during at least part of the admission phase through the second zone of the gaseous fraction enriched in the less adsorbable main constituent, an additional extraction of the gases is effected at the level of the first zone.

The method according to the invention is applied in a fairly general manner to the separation of gases having relatively low boiling points, at a temperature relatively distant from their boiling points, for example at ambient temperature, in the presence of impurities with relatively high boiling points, present in proportions which may reach a few per cent in volume. As examples of such gaseous mixtures, there may be cited air, mixtures of methane and hydrogen, methane and helium, nitrogen and hydrogen, carbon monoxide and hydrogen. As examples of impurities, there may be mentioned carbon dioxide, water vapor, hydrogen sulfide, carbonyl sulfide, carbon disulfide, the mercaptans, ammonia, nitrogen, dioxide, the acetylene and ethylene hydrocarbons.

There is described below by way of nonlimitative example and with reference to the figures of the accompanying drawings, a method of separation of pure hydrogen from a gaseous mixture containing 61 percent by volume of hydrogen, 35.8 percent of carbon monoxide and 3.2 percent of carbon dioxide, over an active carbon sold by the company Barnebey & Cheney, under the commercial designation AC 4.

Figure 1:
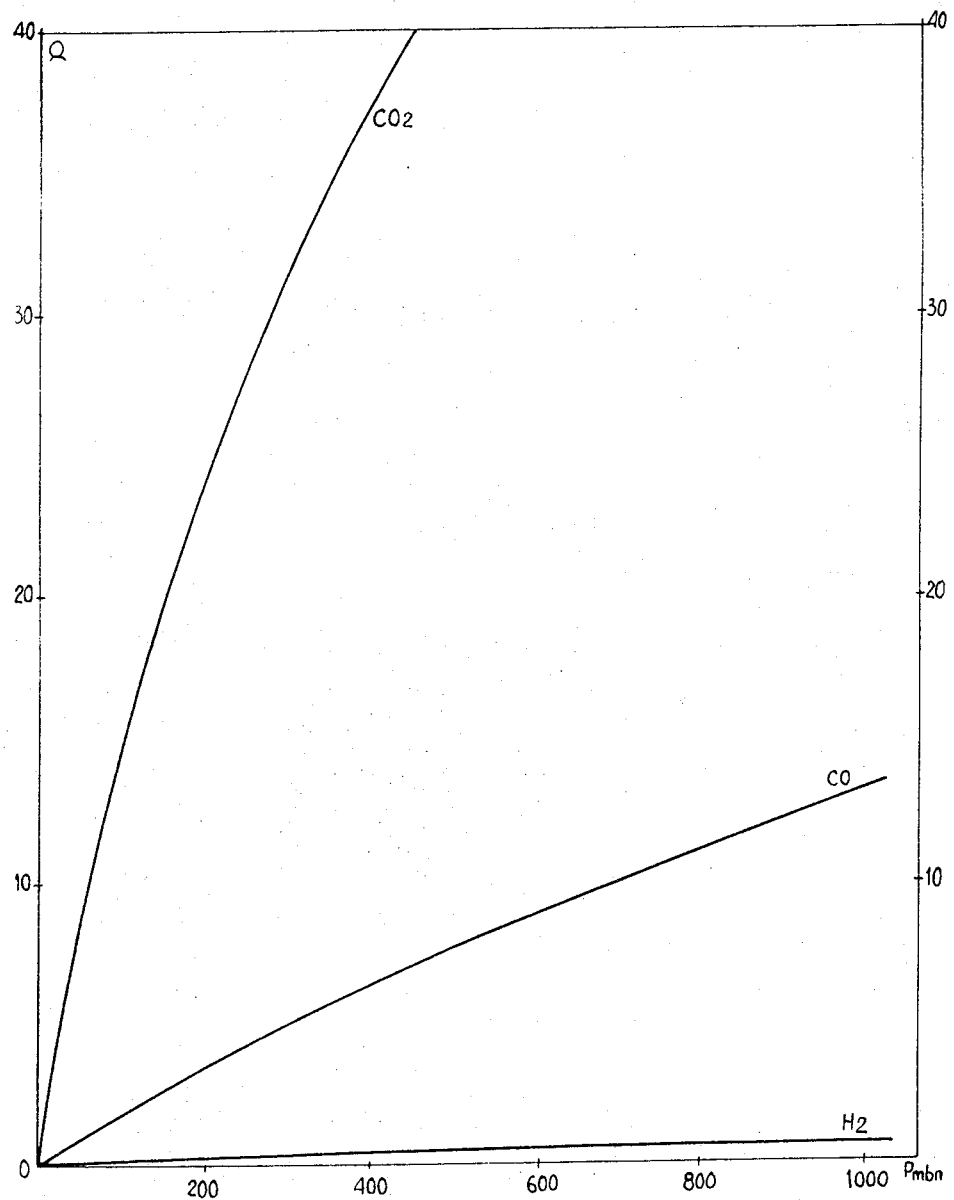
FIG. 1 shows the adsorption isotherms at 20° C. (in cc. of gas referred to normal conditions, per gram of anhydrous adsorbent, as a function of the pressure of the gas in millibars), of hydrogen, carbon monoxide and carbon dioxide over the active carbon AC 4 of the Barnebey & Cheney Company, in the crushed state.

It can be seen from FIG. 1 that the adsorption isotherms at 20° C. of carbon monoxide and hydrogen are substantially straight lines, and that the hydrogen is considerably less adsorbed than the carbon monoxide. The mixture thus lends itself to easy separation at ambient temperature, with regeneration of the adsorbent by simply putting it under vacuum.

On the other hand, the adsorption isotherm of carbon dioxide has an average slope which is much steeper than the other two, and it is fairly strongly incurved. The carbon dioxide is thus strongly adsorbed and cannot be eliminated in a satisfactory manner by putting under vacuum during the course on one cycle.

Figure 2:
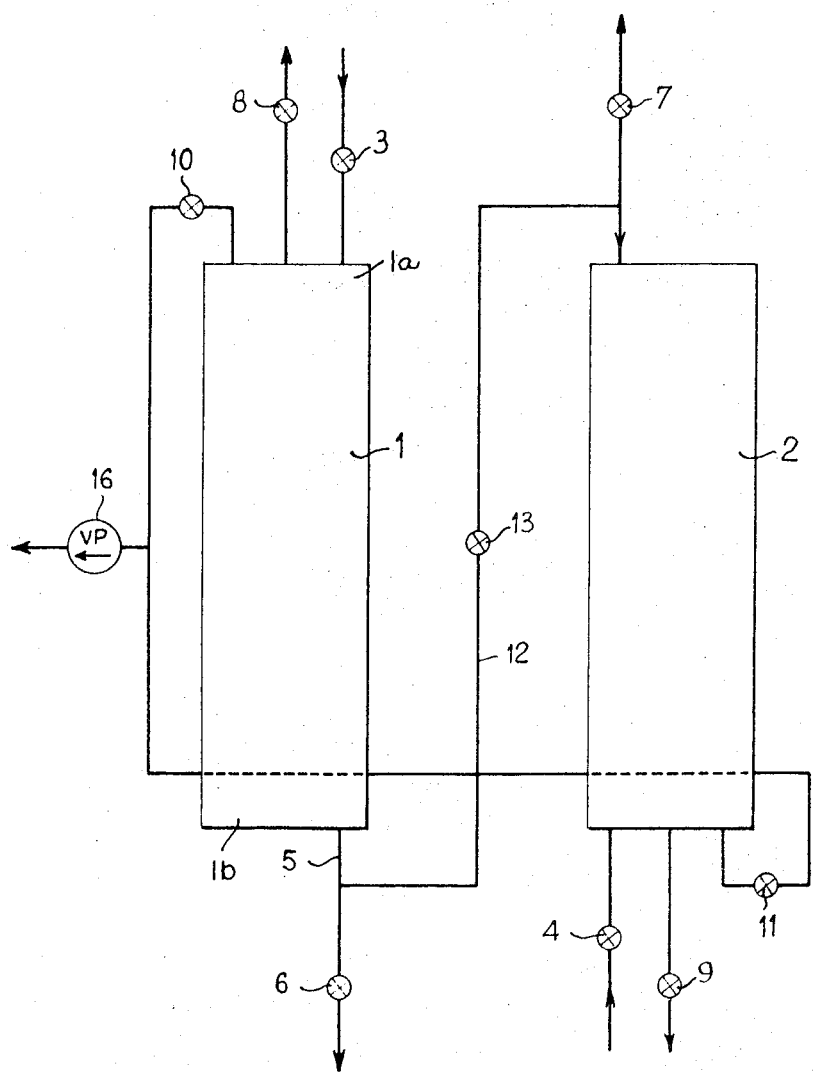
FIG. 2 shows the separation device working by adsorption, employed in one form of application of the invention.

In the apparatus shown in FIG. 2, each of the columns 1 and 2, having a length of 820 mm. and an internal diameter of 54 mm. (or a volume of 2 liters) is filled with 1.034 grams of active carbon AC 4 in granular form. The dimensions of the columns have been chosen so as to permit maximum travel of the gases through the adsorbent, thus improving the contact, while at the same time the column was limited to a length which permits the loss of pressure to be kept at an acceptable value.

Column 1 is first of all degasified and is then filled with hydrogen at the bottom extremity until the pressure reaches atmospheric pressure. The gaseous mixture to be separated (61 percent by volume of hydrogen, 35.8 percent of carbon monoxide and 3.2 percent of carbon dioxide) is then introduced into a first zone 1a of the column 1 through an open valve 3, valves 6, 8, 10 and 13 being closed, until the pressure has risen to 22.5 bars. The valve 3 is then closed and the extraction valve 6 is opened.

A gaseous fraction constituted by substantially pure hydrogen, with less than 50 volumes per million of carbon monoxide, is extracted through the conduit 5 from a second zone 1b of column 1 until the pressure therein has fallen to 3 bars. The major portion of this is sent through the valve 6 to the utilization point or to a storage vessel. However, during this expansion, a portion of the hydrogen is permitted to escape by opening the valve 13, through the conduits 12 and 5 towards the upper extremity (which is in this case the drawing off extremity) of the second adsorbent column 2. The pure hydrogen fills this column which has previously been degasified to a residual pressure of 1 or 2 millibars, until the pressure therein has risen to atmospheric pressure.

When the drawing off is completed, the pressure in the column 1 is higher than atmospheric pressure. The valves 6 and 13 are closed.

The valve 8 is then opened and there if evacuated from first zone 1a of the adsorbent column 1, in a direction contrary to the admission, a gaseous fraction rich in carbon monoxide, until the pressure has again become equal to atmospheric pressure. The valve 8 is then closed and the valve 10 is opened putting the adsorbent column 1 into communication with the vacuum pump 16. The latter is permitted to evacuate a residual gaseous fraction rich in carbon monoxide and containing carbon dioxide from first zone 1a, the pressure in the column falls to about 1 millibar at the end of 7 minutes.

The valve 10 is then closed and pure hydrogen extracted from the upper extremity of the adsorbent column 2 during the course of operation is introduced into second zone 1b of the column 1 through the valve 13 and the conduits 12 and 5 until the pressure in the column 1 is brought up to atmospheric pressure. The column 1 is then ready for a fresh operation of separation.

The adsorbent column 2 comprises the same accessories as the column 1, but its supply is effected through the lower extremity and the extraction from the upper extremity. It is connected to an introduction valve 4, to the extraction 7 for pure hydrogen, to an extraction valve 9 for the gaseous fraction enriched in carbon monoxide, and to the valve 11 for communication with the vacuum pump 16.

With a column such as that having the dimensions indicated above, there are treated in one operation 63.6 liters of gaseous mixture (referred to normal conditions) and there are obtained 33.65 liters of hydrogen having less than 50 volumes per million of carbon monoxide and a content of carbon dioxide which cannot be detected. The proportion of extraction of the hydrogen from the initial gaseous mixture is 87 percent.

In order to verify that the carbon dioxide does not however progress into the beds of adsorbent during the course of successive cycles, until it appears at the extraction extremity, two series of separation cycles were carried out following the method of operation already described with reference to FIG. 2 (with the introduction of pure separated hydrogen into the adsorbent column in the direction opposite to that of admission of the gaseous mixture).

In a first series of cycles, the operation of separation previously described was repeated seven times.

The average volume of gaseous mixture treated was 55.6 liters (referred to normal conditions) and the average volume of hydrogen extracted was 33.65 liters. The proportion of extraction of the hydrogen was 87 percent. At the end of seven successive cycles, the carbon dioxide had not appeared in the separated hydrogen.

In order to make sure that the carbon dioxide does not however move very slowly in the adsorbent bed, a second series of cycles was carried out, working under the conditions in which the carbon dioxide would have passed through the whole column. To this end, pure carbon dioxide is introduced into the degasified column, after which a vacuum is created to a residual pressure of 1 or 2 millibars. The same cycles of separations are then repeated as in the first series of tests.

Figure 3:
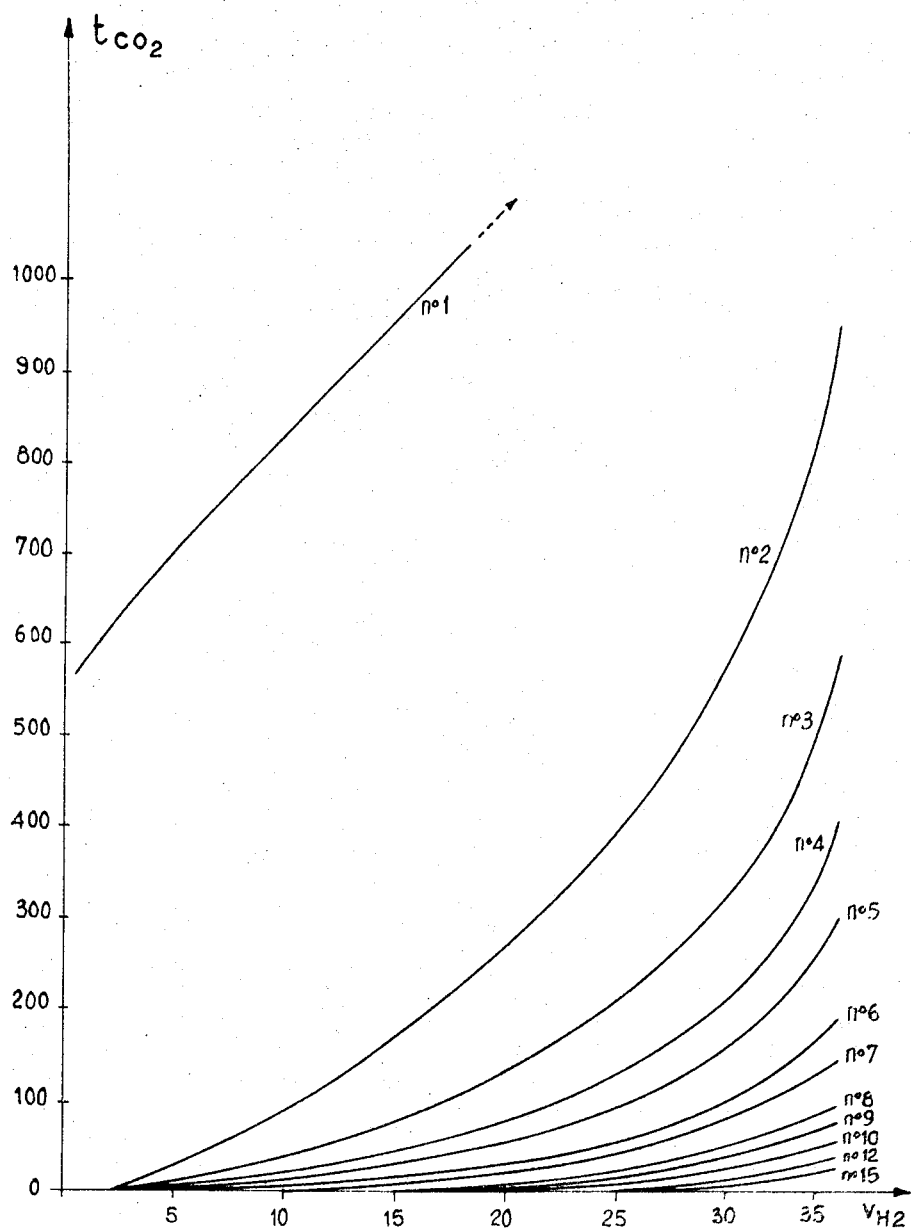
FIG. 3 shows the instantaneous contents of carbon dioxide $t_{CO_2}$ as a function of the volume of hydrogen $V_{H_2}$ extracted from the column during the course of successive separation cycles of the above mixture, after the introduction of pure carbon dioxide in contact with the degasified adsorbent mass and then putting under a vacuum of 1 to 2 mm. of mercury.

The results of these tests are shown in FIG. 3. This figure gives the curves of instantaneous contents of carbon dioxide (in volume per million) of the extracted hydrogen, as a function of the number of liters of hydrogen extracted. The numbers placed against each of the curves correspond to those of the separation cycles. It is observed that from one cycle to the next following, the content of carbon dioxide in the hydrogen extracted constantly diminishes. After 15 cycles, the average content of carbon dioxide in the hydrogen passing out is less than 3 volumes per million.

On the average, there are obtained by the operation:

| | |
|---|---|
| Total volume of gaseous mixtures treated | 62.7 litres |
| Volume of hydrogen produced | 33 litres |
| Proportion of hydrogen extracted | 86%. |

Content of impurities in the hydrogen after stabilization following a large number of cycles:

| | |
|---|---|
| Carbon dioxide | substantially nil, |
| Carbon monoxide | less than 50 volumes per million. |

It will be understood that various modifications may be made of the method which has been described above without thereby departing from the scope of the invention. In particular, the operation of extraction of hydrogen can be commenced during the admission stage of the mixture and may comprise a substantially constant pressure stage during which the gaseous mixture circulates through the column of adsorbent at the admission pressure. This phase is then followed by the extraction or drawing off operation with expansion, as previously described.

Similarly, the operation of sending the pure separated hydrogen back into contact with the degasified adsorbent mass may comprise the evacuation of a part of this hydrogen, preferably through the inlet extremity of the gaseous mixture to be separated. A part of the hydrogen is then collected in a slightly less pure state, slightly contaminated by carbon dioxide and carbon monoxide, but the part of the hydrogen collected in the next following stage is obtained at a higher purity than with the absence of this supplementary elution of the impurities which remained adsorbed.

If the purity of the part of the hydrogen which as served for the elution of the impurities is insufficient, it can be recycled into the gaseous supply mixture.

For this same type of separation, it is also possible to utilize as the adsorbent mass, instead of active carbon, other adsorbents such as synthetic zeolites, for example mordenite or those sold by the Union Carbide Company by the commercial name of synthetic zeolites 13 X or 5 A, the criterion of the choice of the adsorbent mass and the temperature at which the operation is carried out for a given separation, being on the one hand that it adsorbs the two main constituents of the mixture in unequal proportions, in such manner that the separation factor of these constituents is not negligible, and on the other hand that it is readily desorbed by simply reducing the pressure of the more adsorbable main constituent.

Separations of different gaseous mixtures can of course be effected on different adsorbents when the adsorption isotherms of the main constituents and the impurities of these mixtures have properties similar to those of the isotherms of FIG. 1 for the mixture of hydrogen, carbon monoxide and carbon dioxide.

In an alternative form, the adsorbent is contained in two chambers, the introduction of the mixture being made to the first chamber, followed by an expansion in the second chamber and then by an extraction from the second chamber, for the purpose of increasing the expansion and improving the quality of the separation. Regeneration is carried out on the two chambers in a manner similar to that which has been described above.

It will be understood that the invention is not in any way limited to the above examples; it is capable of receiving numerous other modifications and alternative forms, as understood by those skilled in the art, depending on the applications considered, without departing from the spirit of the invention.

What we claim is:

1. A method separating by substantially isothermal adsorption, in two elongated chambers containing an adsorbent mass, a gaseous mixture containing two main constituents a first of which is more readily adsorbable to said adsorbent mass than the second main constituent, said gaseous mixture further containing an impurity which is sufficiently strongly adsorbed to said adsorbent mass so that a substantial proportion of said impurity remains adsorbed above atmospheric pressure, the said method being alternately conducted in said two chambers by successive adsorption and desorption in each chamber, and comprising the steps of placing a first chamber under vacuum by connecting a first end of the first chamber with a vacuum pump, introducing through a second end of said first chamber after the application of vacuum a gaseous fraction enriched in said second constituent withdrawn from the second chamber until atmospheric pressure is reached, introducing through the first end of said first chamber the gaseous mixture to be separated until a superatmospheric pressure is reached, removing from the second end of said first chamber by expansion to an intermediate pressure, a gaseous fraction enriched in said second constituent at least a fraction of which is introduced into said second chamber in order to reach atmospheric pressure in said second chamber, removing through said first end of the said first chamber a gaseous mixture rich in said first constituent until atmospheric pressure is reached and removing through said first end of said first chamber a fraction rich in said impurity until a subatmospheric pressure is reached, said two chambers being connected together by their second ends and the gaseous circulation during the adsorption steps being effected in opposite directions in the said chambers.

* * * * *

UNITED STATES PATENT OFFICE
CERTIFICATE OF CORRECTION

Patent No. 3,638,398           Dated February 1, 1972

Inventor(s) Daniel Domine et al

It is certified that error appears in the above-identified patent and that said Letters Patent are hereby corrected as shown below:

On the cover sheet [72] the inventor's name "Leon Jay" should read -- Leon Hay --.

Signed and sealed this 7th day of November 1972.

(SEAL)
Attest:

EDWARD M. FLETCHER, JR.　　　　　　ROBERT GOTTSCHALK
Attesting Officer　　　　　　　　　　Commissioner of Patents